United States Patent [19]
Di Frank et al.

[11] 3,850,319
[45] Nov. 26, 1974

[54] CORRUGATED BOARD BUNDLE STACKER

[75] Inventors: Frank J. Di Frank, Toledo, Ohio;
Daniel L. Greiwe, Chicago, Ill.

[73] Assignee: Owens-Illinois, Inc., Toledo, Ohio

[22] Filed: Apr. 24, 1973

[21] Appl. No.: 354,009

Related U.S. Application Data

[62] Division of Ser. No. 205,016, Dec. 6, 1971, Pat. No. 3,770,144.

[52] U.S. Cl.................... 214/152, 198/35, 214/1 Q, 214/1 BD, 214/6 D, 214/6 DK, 271/20 S
[51] Int. Cl............................................. B65g 57/08
[58] Field of Search....... 270/82, 78; 93/93 R, 93 C, 93/93 DP; 198/35; 214/6 G, 6.5, 6 DK, 6 N, 6 FS, 6 H, 1 B, 152, 1 BD, 1 Q; 271/65, 82, 83, 70, 184, 185, 186, 192, 205

[56] References Cited
UNITED STATES PATENTS

| | | | |
|---|---|---|---|
| 3,142,388 | 7/1964 | Cole | 93/93 DP |
| 3,267,531 | 8/1966 | Buttkeneit et al. | 214/6.5 |
| 3,462,026 | 8/1969 | Macchenone | 271/83 |
| 3,617,054 | 11/1971 | Schilling | 214/6 DK |
| 3,633,731 | 1/1972 | Jones | 198/35 |
| 3,675,790 | 7/1972 | Auril | 214/6 G |

FOREIGN PATENTS OR APPLICATIONS

| | | | |
|---|---|---|---|
| 971,421 | 9/1964 | Great Britain | 214/6 G |

*Primary Examiner*—Frank E. Werner
*Attorney, Agent, or Firm*—Steve M. McLary; D. T. Innis; E. J. Holler

[57] ABSTRACT

Apparatus for receiving single or multiple bundles of corrugated board blanks from a corrugator in which the bundles are automatically picked up and in the preferred embodiment stacked on a cart, with alternate bundles being placed upside down with respect to the orientation of their delivery to the mechanism.

The disclosed mechanism is capable of handling full, corrugator width, single bundles of board or a plurality of less wide bundles at one time, thus obviating the necessity of having extremely high speed handling equipment or large off-bearer crews to handle the production from a corrugator. The bundles themselves, when stacked on the cart or truck, are placed in striated form for ease of unloading at another position.

2 Claims, 21 Drawing Figures

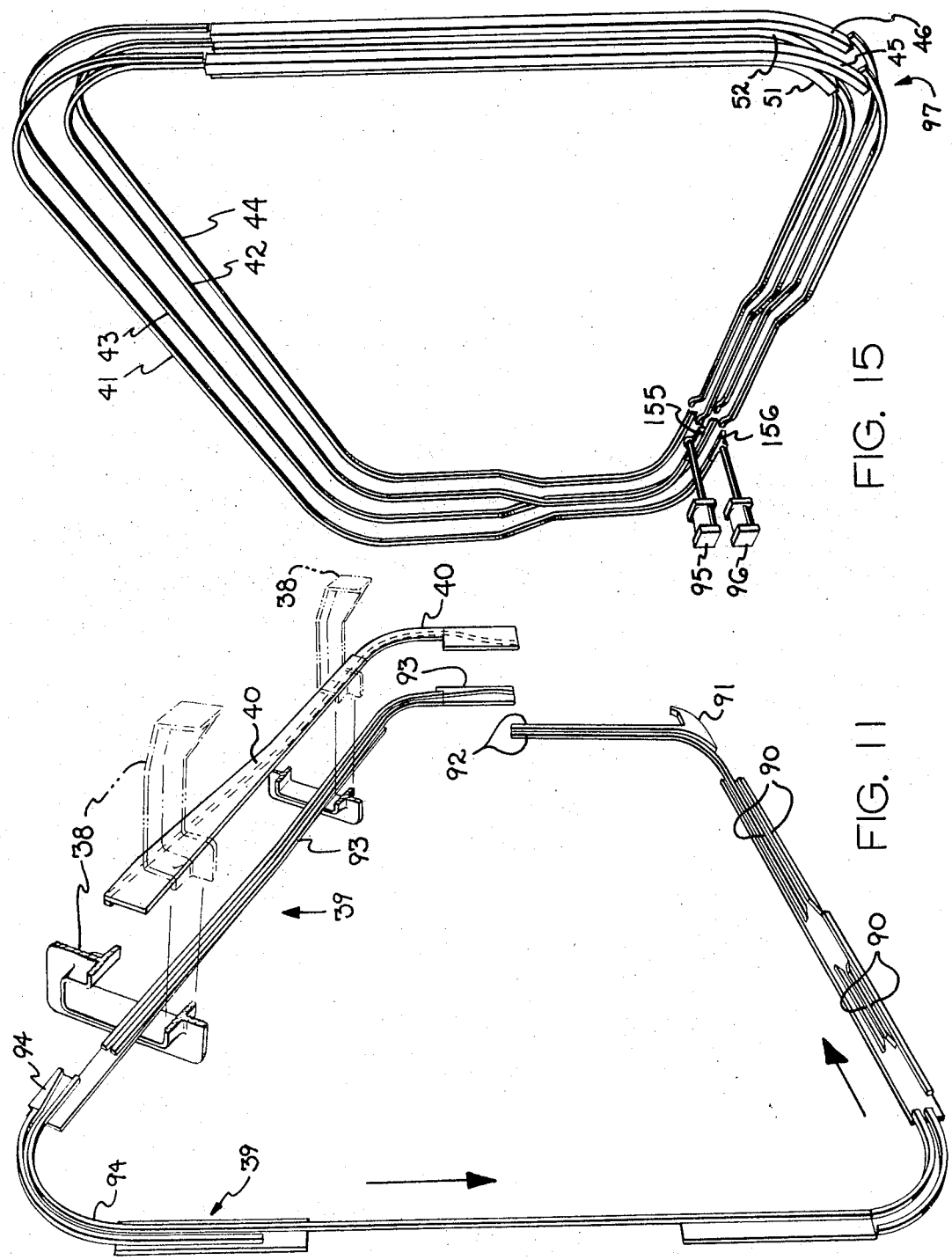

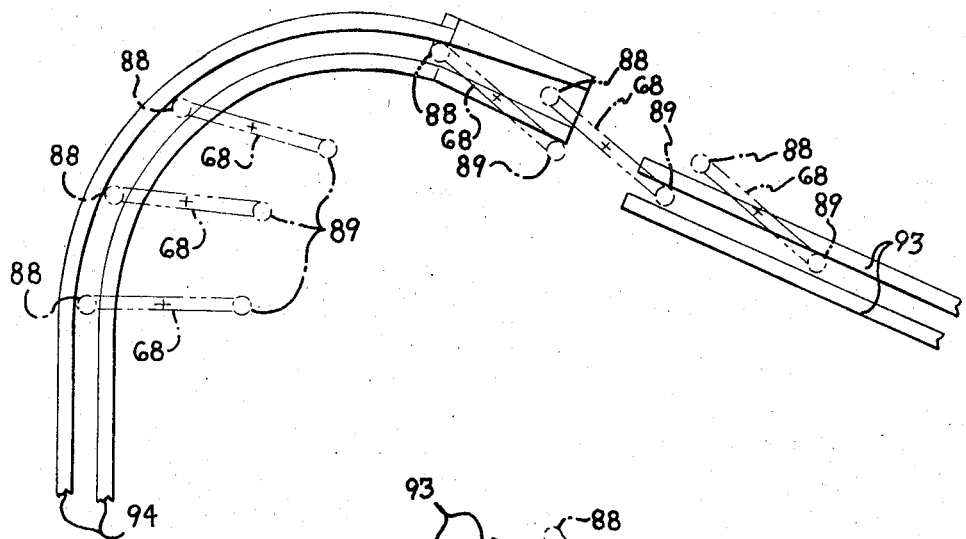
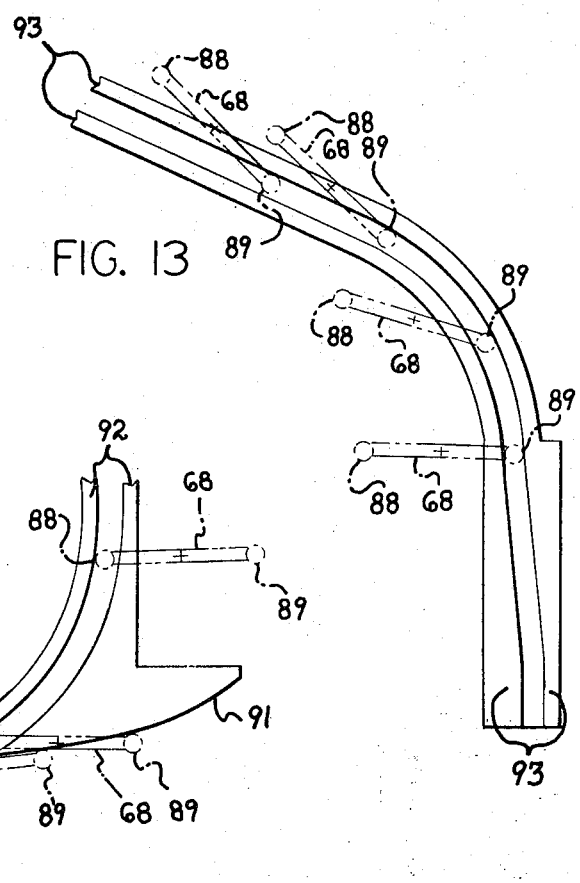
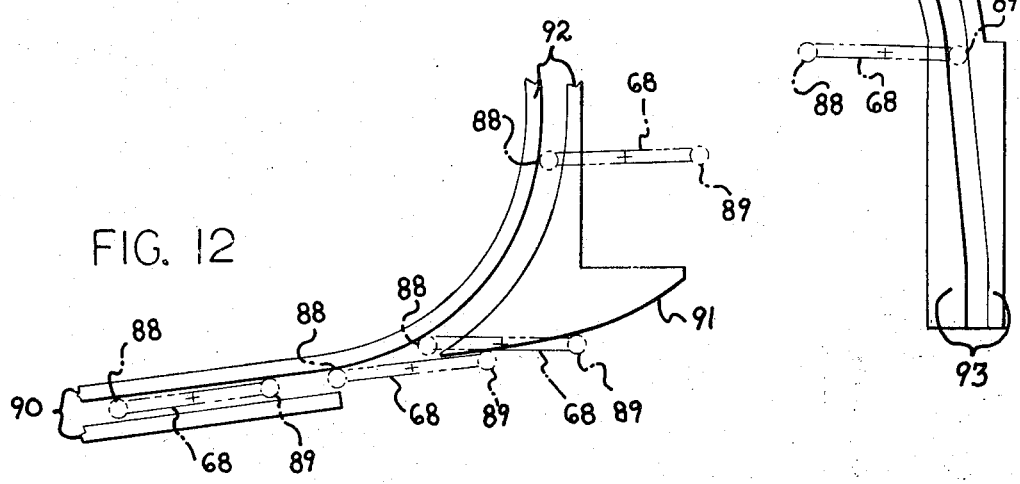
FIG. 14
FIG. 13
FIG. 12

CORRUGATED BOARD BUNDLE STACKER

This is a division of application Ser. No. 205,016, filed Dec. 6, 1971, now U.S. Pat. No. 3,770,144.

BACKGROUND OF THE INVENTION

It has been a problem in the corrugated box board operation to handle the production of a corrugator in a manner which does not require handling single sheets one at a time or in manually handling bundles which are accumulating at the end of the corrugator. With this in view, sheets of corrugated in box blank length are delivered to a bundle accumulation point where a plurality of the sheets or blanks are stacked and then moved as a bundle from the currugator to an unloading position.

It has been the practice in the past to manually pick the bundles from the unloading position, usually a conveyor, and stack the bundles on trucks. It is a well know fact that corrugators do not usually produce box blanks which are of the same width as the entire corrugator or, in fact, product multiple box blanks having widths which are less than the corrugator width. For example, it is not infrequent that as many as five separate box blanks are being produced simultaneously from a single moving sheet of corrugated board in a corrugator. When these blanks are accumulating into bundles, a situation arises where there are five bundles which must be extracted from the corrugator machine, piled on trucks, then moved either to an assembly point, die cutting machine or perhaps to a printer slotter.

It can readily be appreciated that the production of the corrugator is extremely high speed in relation to the time involved in shifting accumulated bundles and thus any slight upset in the unloading operation creates a problem which frequently necessitates shutting down the corrugator. Continuous operation of the corrugator is desirable from the viewpoint of producing consistently good board.

It is with this in view that the present invention finds its greatest utility in handling multiple bundles which are, for example, side ejected from a corrugator, with the multiple bundles being simultaneously picked up and moved to and stacked on a truck.

In the past, the only available equipment that has been partially successful in use in this area has been equipment which handles a single bundle at a time and has been incapable of alternating the placing of the bundles right-side-up and upside down on the truck. This ability to reverse stack the bundles is advantageous from the point of view that some corrugated sheets, inherent in the manner in which they are made, may tend to warp and by reverse stacking, warpage is kept to a minimum.

SUMMARY OF THE INVENTION

This invention pertains to apparatus and process for receiving plural bundles of corrugated board simultaneously grasping the plural bundles and moving the bundles in the receiving position and depositing them on a truck or other bundle-receiving device, with the capability of reverse stacking of alternate bundles and providing a striated stack of bundles at the location of the truck or other receiving device.

BRIEF DESCRIPTION OF THE DRAWINGS

FIG. 5 is a top plan view of the clamp mechanism of FIG. 3;

FIG. 11 is a perspective view of the turn-over and guide cams for the clamp mechanism removed from the rest of the mechanism for clarity;

FIG. 12 is a schematic side view of a portion of the turn-over cam of FIG. 11 on an enlarged scale;

FIG. 13 is a schematic side view of another portion of the turn-over cam of FIG. 11;

FIG. 14 is a schematic side view of a third portion of the turn-over cam of FIG. 11 on an enlarged scale;

FIG. 15 is a perspective view of the clamp shifting and operating guide cams removed from the mechanism of FIG. 2 for clarity of illustration;

FIG. 1 illustrates generally how the invention would appear in its operational environment. The apparatus of the invention is supported by two spaced-apart machine bases 9 and 10. A pair of horizontal connecting beams 11, the upper onE of which serves as a rail in a manner to be discussed later, serve to tie together the machine bases 9 and 10 and form a rigid structure. Mounted on the connecting beams 11 are two mechanism carriers generally designated 12 and 13. Contained within the mechanism carriers 12 and 13 are the drive components and operating cams of the machine. In order to clearly describe the general function of the machine and avoid confusing detail, these components are hidden by sheet metal shrouds in FIG. 1, as they normally would be in operation. All of the components will be discussed in detail later. A main drive motor 15 serves to deliver power to both of the mechanism carriers 12 and 13. This single power source insures proper timing of the motions of the components carried by the two mechanism carriers 12 and 13. An elongated main drive shaft 16 transmits power to the mechanism carrier 13 and to the mechanism carrier 12. An elongated threaded shaft 20 extends through a fixed nut (not shown) attached to the mechanism carrier 13. One end of the threaded shaft 20 is rotatably mounted in a thrust bearing 21 fixed to the connecting beam 11. The other end of the threaded shaft 20 is attached to a drive motor 22. When the drive motor 22 is operated, the shaft 20 will rotate and shift the mechanism carrier 13 by reason of the fact that it is coupled to the threaded shaft 20 by a fixed nut.

Figure 1:
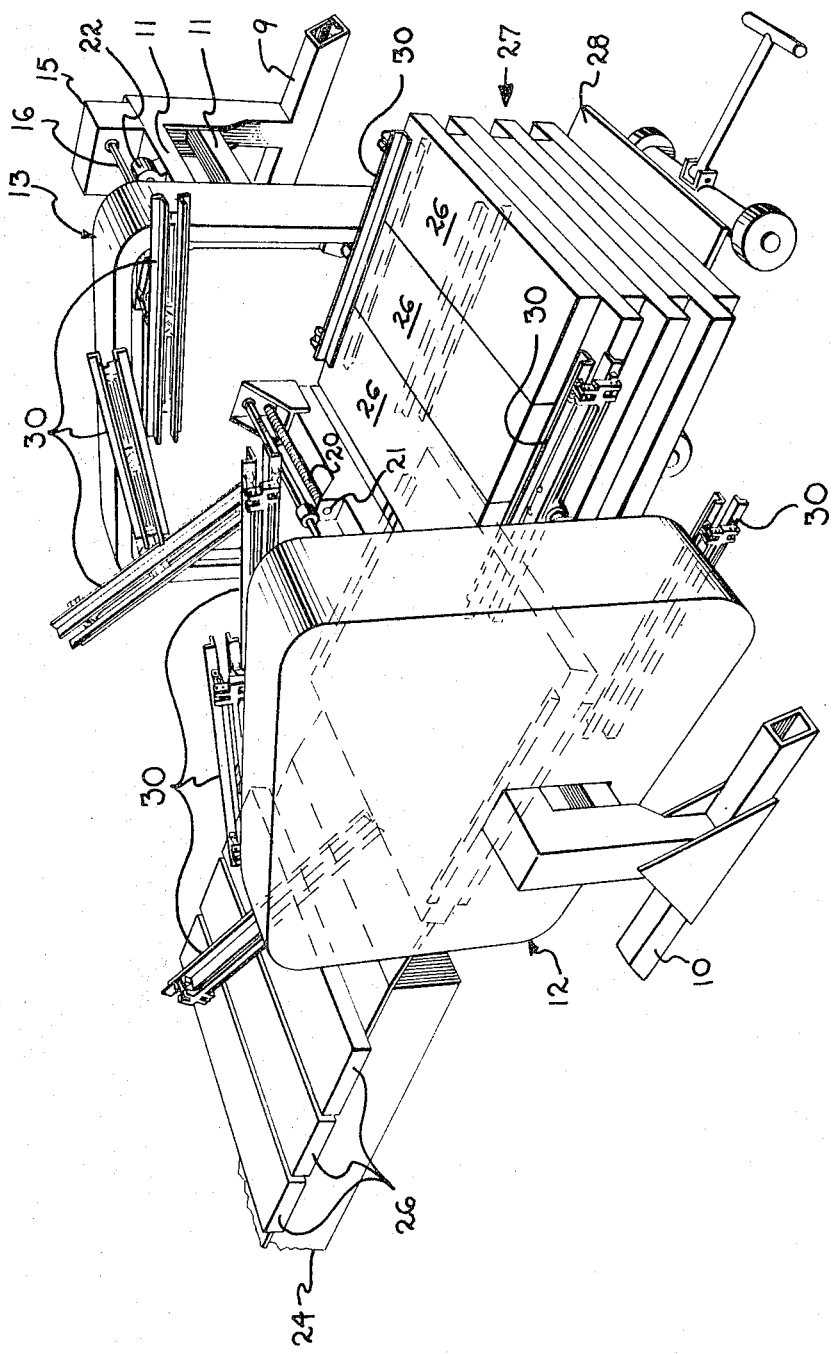
FIG. 1 is a perspective view of the apparatus of the invention.

During such operation, the connecting beams 11 act as a rail to guide the motion of the mechanism carrier 13. This feature allows the space between the two mechanism carriers 12 and 13 to be adjusted.

An input conveyor 24 delivers a group of bundles 26 of corrugated sheets from a bundle making device (not shown), many types of which are well-known in the art and typically termed off-bearing units. These bundles 26 can be of varying thickness and planar dimensions. The adjustment of the machine to accommodate bundles 26 of varying size is effected by moving the mechanism carrier 13 as described above. The machine is self-adjusting for bundles 26 of varying thickness, as will be explained later. A group of corrugated bundles 26 are shown stacked at the output end of the machine on a bundle trailer 28. If desired, the bundle trailer 28 could be replaced by a removal conveyor; however, the stacker of the invention has as one of its principal features the desirable result of being an accumulator for the production of high speed corrugating machines.

A series of clamps 30 are distirbuted about the inner periphery of the mechanism carriers 12 and 13. These clamps 30 are aligned in pairs, one of the pair associated with mechanism carrier 12 and the other with mechanism carrier 13. In the illustrated embodiment, six pairs of clamps 30 are shown, but it is obvious that a greater or lesser number of pairs could be utilized, depending on the particular circumstances. The clamps 30 are carried by carriages which are not shown in FIG. 1, but will be described in detail later.

This machine will carry out the following operations: Groups of bundles 26 will be picked up by the clamps 30, transported from the input conveyor 24 (the load end of the machine), and deposited in a stack on the bundle trailer 28 (the unload end of the machine). Every second bundle 26 will be shifted to the right relative to the horizontal centerline connecting the input and output ends of the machine, with the intervening bundles 26 being shifted to the left relative to the centerline. This shifting will give a stratified stack 27 having the appearance of the stack 27 shown on the bundle trailer 28 in FIG. 1. This off-setting of the bundles 26 will allow easy separation of individual bundles 26 for subsequent processing steps. Furthermore, selectively, every second bundle 26 will be turned 180° with relation to its position on the input conveyor 24 before deposit on the stack. This rotation is desirable in those situations where the corrugated sheets which comprise the bundles 26 may be slightly wet on one side from the manufacturing process. As the sheets dry, the bundles 26 tend to warp. If all of the bundles were stacked in the same orientation, the warp would be accentuated. By turning every other bundle 26 180°, the effects of warpage of the bundles tend to be cancelled rather than to be accentuated.

Figure 2:
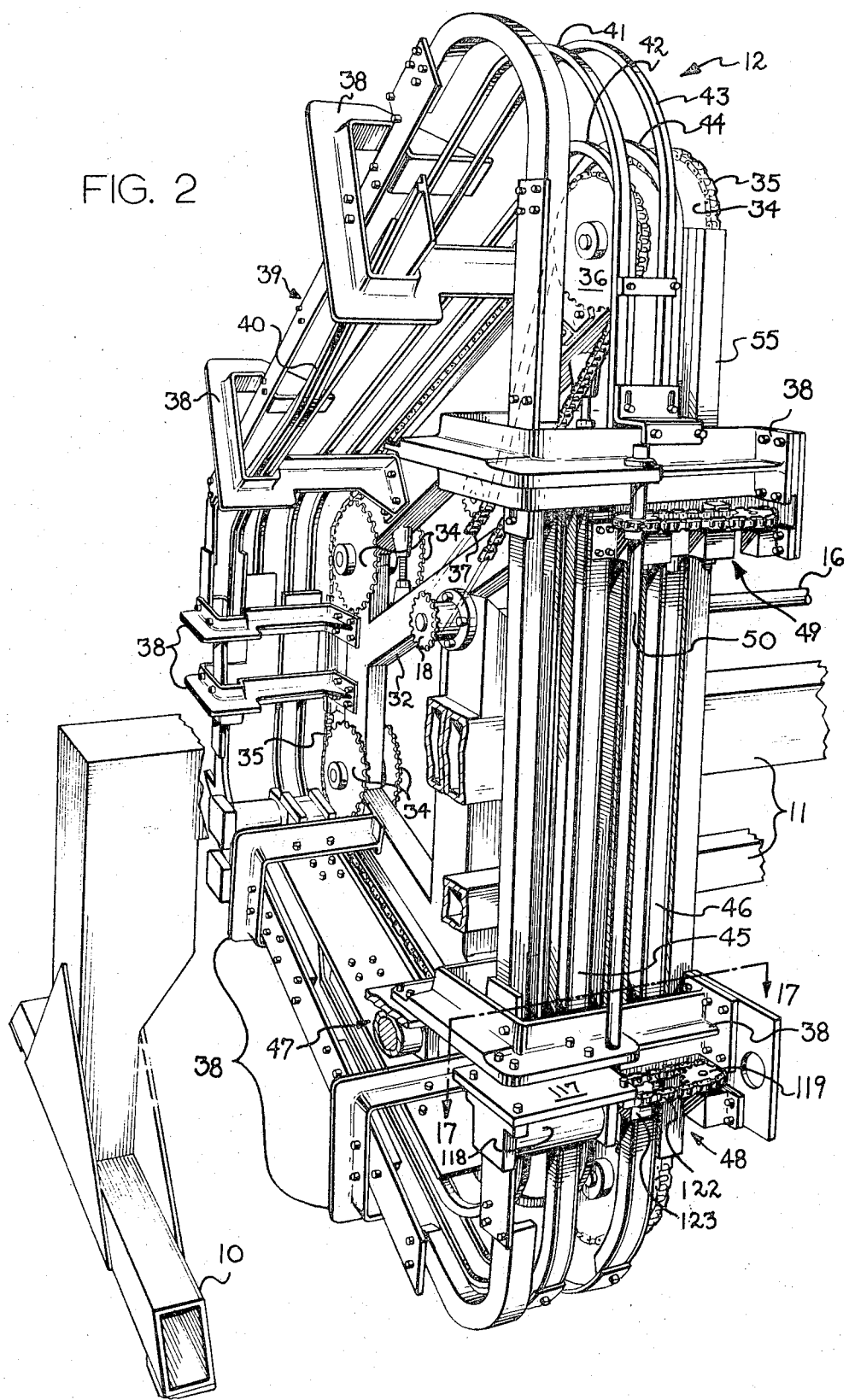
FIG. 2 is a perspective view of the left-hand clamp-guiding and supporting mechanism.

Referring now to FIG. 2, the mechanism carrier 12 is shown with the covering shroud removed. The mechanism carrier 13 is a substantially identical right-hand version of the mechanism carrier 12, which may be considered a left-hand version. The difference in the two mechanism carriers 12 and 13 is that the mechanism carrier 12 is fixed to the connecting beams 11, while the mechanism carrier 13 is movable along the connecting beams 11 under the influence of the threaded shaft 20, and the operating cams (later to be described) carried by the mechanism carrier 13 are essentially mirror images of those carried by mechanism carrier 12.

For ease of reference, the loading station (which is toward the rear as viewed in FIG. 2) will be designated the "rear" of the machine and the unloading station will be designated as the "front" of the machine. In FIG. 2, a main frame member 32 is firmly attached to the connecting beams 11. The connecting beams 11 have been partially cut away to avoid obscuring the portions of the mechanism carrier 12 lying to the rear. Rotatably mounted to the frame 32 are four pairs of chain sprockets 34. The pairs of sprockets 34 are mounted at the four extreme corners of the frame 32, the pair in the front lower corner not being visible in this view. An endless chain 35 is trained over both sprockets 34 in the pairs to give two parallel driven chains. The sprockets 34 are driven by the shaft 16 turning a drive sprocket 18. The drive sprocket is in turn connected to a driving sprocket 36 by an endless drive chain 37. The driving sprocket 36 is mounted on and fixed to a common shaft with the top front pair of driven sprockets 34 for rotation therewith. Rotation of this pair of sprockets 34 will in turn rotate all of the sprockets 34 due to the common connection of all of said sprockets 34 through the chains 35.

Also attached to the frame 32 are a series of cam support brackets 38. The brackets 38 support a plurality of cams which control the open and closing motions of the clamps 30 and the lateral shifting of the clamp-carrying carriage (FIGS. 3—8). These cams include the clamp, rear-steadying cam 39 FIG. 11), the clamp roll over cam 40, the outer clamp function control cam 41, the inner clamp function control cam 42 (See FIG. 2), the outer carriage-shifting cam 43, the inner carriage-shifting cam 44, the movable, outer clamp-opening cam 45, and the movable outer carriage-shifting cam 46 (movable cams 51 and 52, similar to the cams 45 and 46 for the inner opening and shifting cams are hidden behind the cams 45 and 46 in FIG. 2, but are in position to receive the cam followers that are being controlled by cams 42 and 44).

The movable outer carriage-shifting cam 46 and the movable outer clamp-opening cam 45 may also properly be referred to as unloading cams, since their function is to cause the clamps to release the bundles 26 for deposit on the stack 27. It should be noted that the adjectives "outer" and "inner" as used to identify the various cams, refer to the position of the cams relative to one another. These cams are shown in an exploded view in FIG. 15, which shows the full extent of the clamp and carriage control cams and their relative configurations.

The movable cams 45 and 46 are moved by an operating mechanism generally designated as 48 in FIG. 2. This mechanism is shown in detail in FIGS. 17–19. A corresponding mechanism 47 is provided for the movable cams 51 and 52. Because the movable cams 45 and 46 are relatively long, a secondary upper operating mechanism 49 is provided to insure parallel movement of the upper and lower portions of the movable cams 45 and 46. The upper mechanism 49 is connected to the lower, powered operating mechanism 48 by a vertical drive shaft 50 which serves to drive the upper mechanism 49 in synchronism with the lower, powered mechanism 48.

Before considering the various cams in detail, the operation of one of the main carriage assemblies 82, upon which the cams operate, will be explained by reference to FIGS. 3, 4, 5, 6, 7 and 8.

Figure 3:
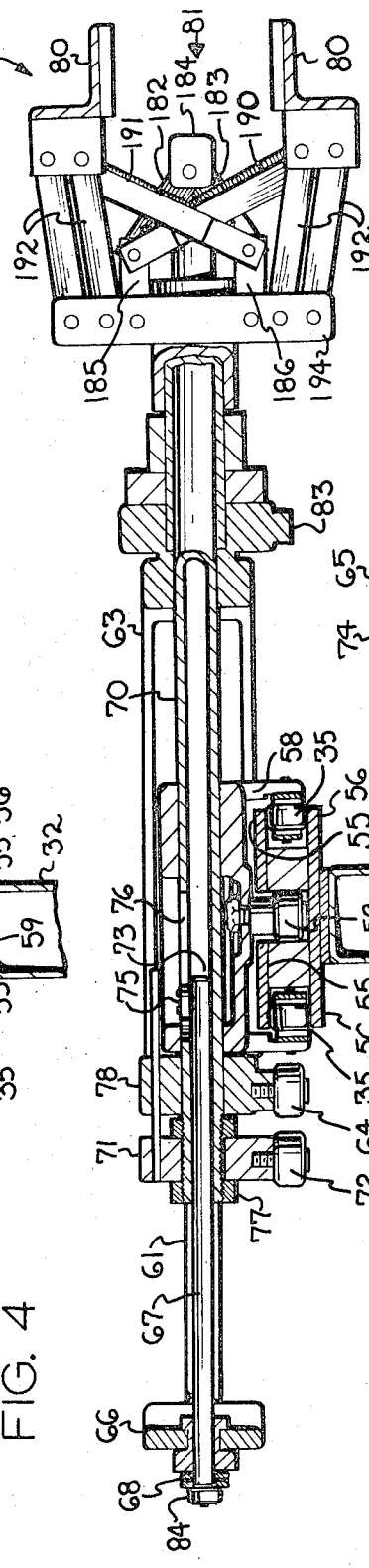
FIG. 3 is a cross-sectional view of one of the clamp mechanisms in open position.

As best seen in FIG. 3, the frame 32, which has portions coextensive with the machine perimeter, serves to support two chain guide rails 55 and 56, which are coextensive with the perimeter of the mechanism carriers 12 and 13 respectively. It should again be noted that while the description given is for a single main carriage assembly 82, for only one of two mechanism carriers 12 and 13, the description will apply equally to the other. The two driven chains 35 are trapped between and guided by the chain rails 55 and 56. A body casting 58 (best seen in FIG. 5) is pinned to the links of the chain 35 and moves with the chain 35 in a fixed path.

The chain rail 55 is in two spaced-apart segments and a tracking follower 59, bolted to the body casting 58, rides in the space between the split chain rail 55. The purpose of the tracking follower 59 is to prevent shifting of the body casting 58 during its travel. The body casting 58 includes four horizontally extending bosses 60 aligned in pairs on each side of the body casting 58. These bosses 60 are provided with aligned openings through which two horizontal guide rods 61 are inserted and pinned in place. The body casting 58 is generally rectangular with a central cavity 62. The casting also is provided with aligned openings extending through the center thereof serving to support a hollow shaft 70.

Slideably mounted on the guide rods 61 is a shiftable housing member 63. A cam follower 64 is attached to the member 63 adjacent of the left-hand end thereof. Displacement of the cam follower 64 will result in the member 63 moving relative to the fixed guide rods 61 and body casting 58. The guide rods 61 also serve to support a bearing carrier 66 for a rotatable arm 68. The carrier 66, being fixed to the body casting 58 through the guide rods 61, will follow a fixed path about the machine. A shaft 67 is rotatably mounted in the carrier 66 and carries the rotatable arm 68. An open/close cam follower 72 is attached to one end of the hollow shaft 70 through a plate 71. The other end of the hollow shaft 70 serves to carry the clamp 30 and functionally effects the opening and closing of the clamp 30. The rotatable shaft 67 is telescoped within the hollow shaft 70. The rotatable shaft 67 is not coextensive with the hollow shaft 70, but rather terminates within the hollow shaft 70 at the point designated as 73. A drive pin 75 attached to the rotatable shaft 67 extends through an elongated slot 76 in the hollow shaft 70. Thus, if the rotatable shaft 67 is rotated, the hollow shaft 70 will also be rotated, driven by the engagement of the pin 75 in the slot 76. This will in turn rotate the clamp 30 which is attached to one end of the hollow shaft 70. It should be noted that the plate 71 carrying the open/close cam follower 72 is not fixed to the hollow shaft 70; rather, the plate 71 is loosely retained between two threaded stops 77 which are fixed to the hollow shaft 70. Thus, rotation of the hollow shaft 70 will rotate the stops 77, but not the plate 71 or the open/close cam follower 72. During such rotation, the plate 71 is stabilized by a stabilizing rod 78 fixed thereto which is slideably mounted in a passage extending through the body casting 58. The operation of the clamp 30, which will be described in detail later, may be generally seen from FIGS. 3 and 5. The complementary jaws 80 of the clamp 30 are biased in a normally open position by springs 200. A toggle mechanism 81 is linked to the jaws 80 to close them. The toggle mechanism 81 is attached to the hollow shaft 70 such that if the open/close cam follower 72 is moved from the position shown in FIG. 3 to that shown in FIG. 4, the jaws 80 will be closed. It should be clear that it is relative displacement of the open/close cam follower 72 with respect to the shifting cam follower 64 which closes the jaws 80. If both cam followers 72 and 64 are moved toward the carrier 66, the clamp 30 will be shifted in that direction, but the jaws 80 will remain open. Conversely, if it is desired to shift the clamp 30 while the jaws are closed, both followers 72 and 64 must be shifted in a manner to maintain their spaced-apart relationship, which defines the position in which the jaws 80 are closed.

Figure 6:
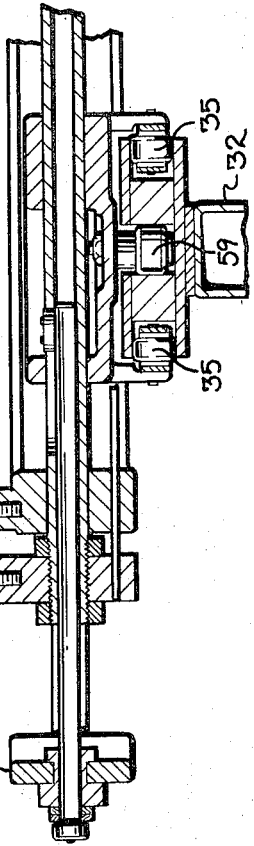
FIG. 6 is a partial view of the second arrangement of the cam followers shown in FIG. 3.
Figure 7:
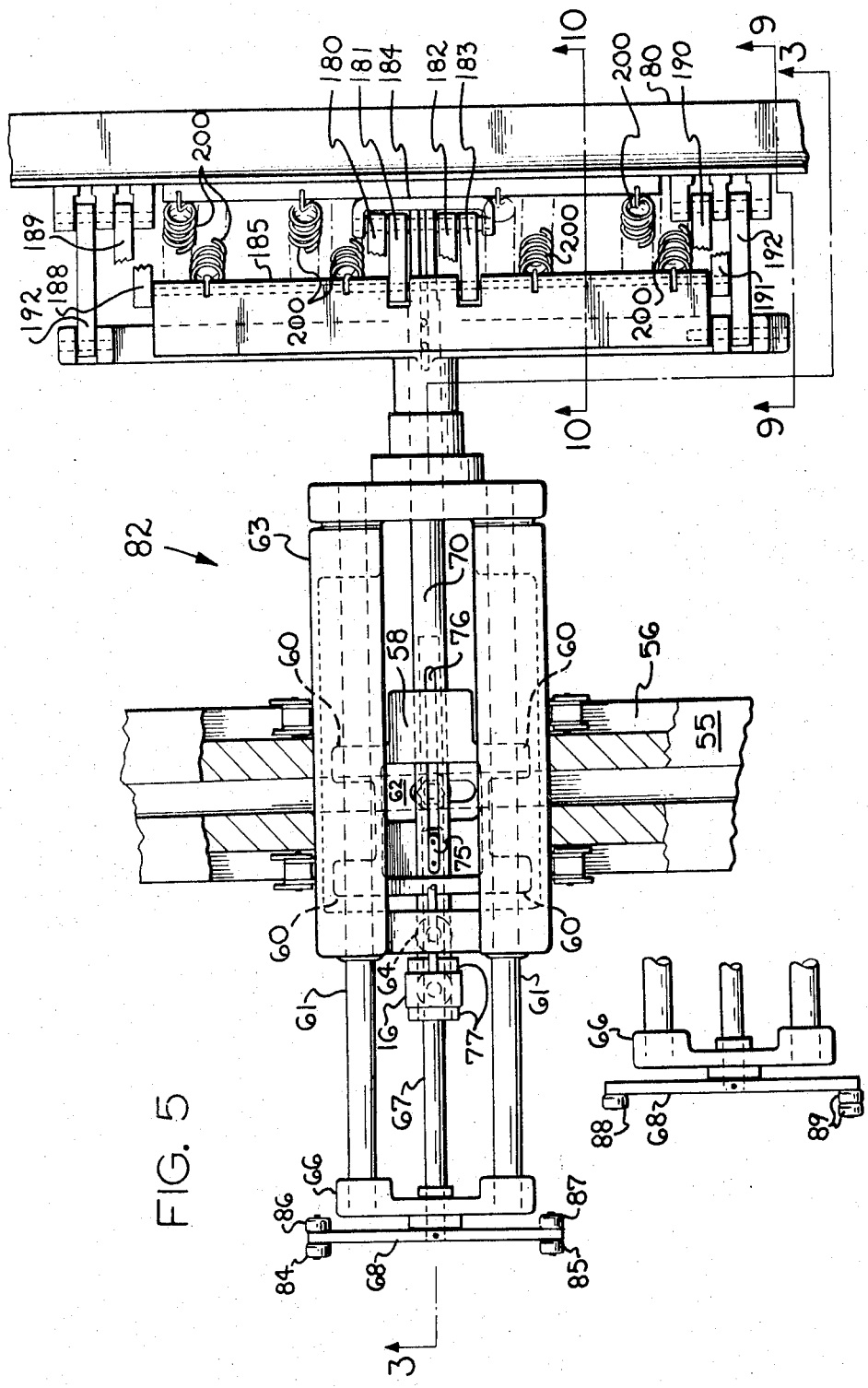
FIG. 7 is a view of the second arrangement of the turn-over cam follower mechanism for the clamp.

One important aspect of the machine is the arrangement of the cam followers on the carriage assemblies 82. In FIG. 3, the two cam followers 72 and 64 are seen directed toward the chain 35 and one-half of all carriage assemblies 82 on the machine are of this configuration, called configuration A for convenience. FIG. 6 shows the configuration of the other half of the carriage assemblies 82 with the cam followers 74 and 65 performing the same functions as followers 72 and 64, but being mounted up relative to the top of the body casting 58, and extending away from the chain 35. This configuration is called B. Referring to FIG. 5, the rotatable arm 68 is seen to carry four rotatably mounted cam followers. Two of the cam followers 86 and 87 are mounted on the side of the rotatable arm 68 facing the clamp 30 and two of the followers 84 and 85 are mounted on the opposite side. This configuration shown in FIG. 5 is designated C, and again one-half of all carriage assemblies 82 have this configuration. The other half of the carriage assemblies 82 are of the configuration shown in FIG. 7 and is designated configuration D. In FIG. 7, the cam followers are all mounted on that side of the rotatable arm 68 which faces away from the clamp 30. As may be seen, on one end of the arm 68, a single follower 88 is mounted, while on the other end of the arm 68, two followers 89 are mounted in tandem.

It is vital in an understanding of the interaction of the cam followers and cams that the configuration of cam followers on each pair of carriages 82 be fully understood. Assuming six pairs of carriages 82, as in the preferred embodiment, and remembering the two mechanism carriers 12 and 13, the following table shows the configuration of each pair of carriages 82 mounted on the mechanism carriers 11 and 12:

TABLE 1

|  | Mechanism Carrier 12 | | Mechanism Carrier 13 | |
| --- | --- | --- | --- | --- |
| Pair 1 | A | C | B | C |
| Pair 2 | B | D | A | D |
| Pair 3 | A | C | B | C |
| Pair 4 | B | D | A | D |

TABLE 1-Continued

|  | Mechanism Carrier 12 | | Mechanism Carrier 13 | |
|---|---|---|---|---|
| Pair 5 | A | C | B | C |
| Pair 6 | B | D | A | D |

Figure 8:
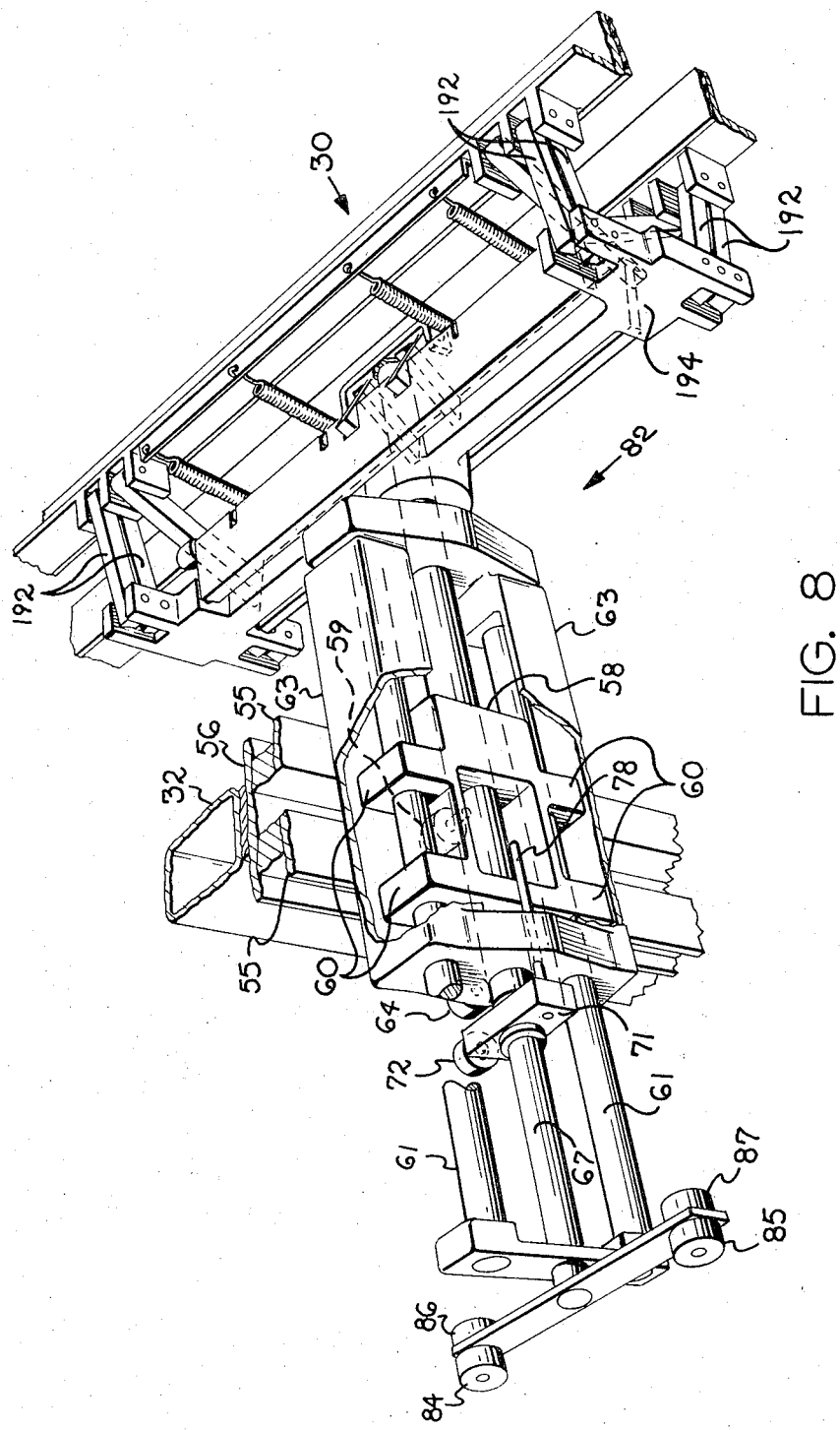
FIG. 8 is a perspective view of the clamp mechanism of FIG. 5, with the clamp turned 180°.

With reference to FIG. 8, it can be seen that the carriage assembly 82, as it would appear traveling downward in the unloading position, has the clamp unit 30 turned 90° with respect to the direction of travel of the assembly 82. It should also be pointed out that the entire clamp unit 30 is mounted on the shifting member 63 and is thus shifted with it.

Figure 4:
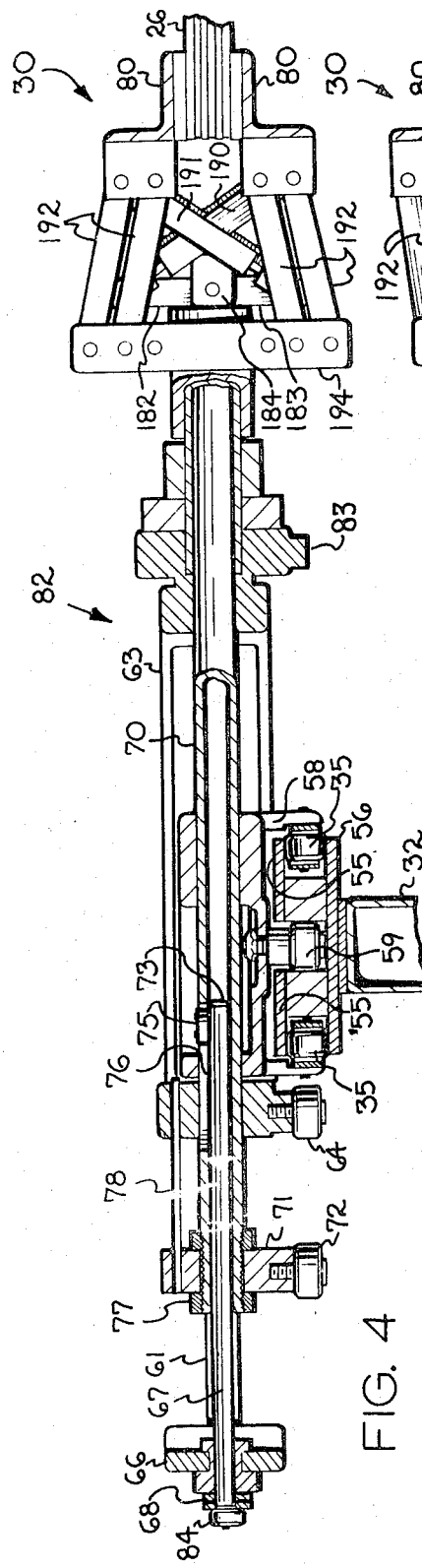
FIG. 4 is a view similar to FIG. 3 with the clamp mechanism in closed position.
Figure 10:
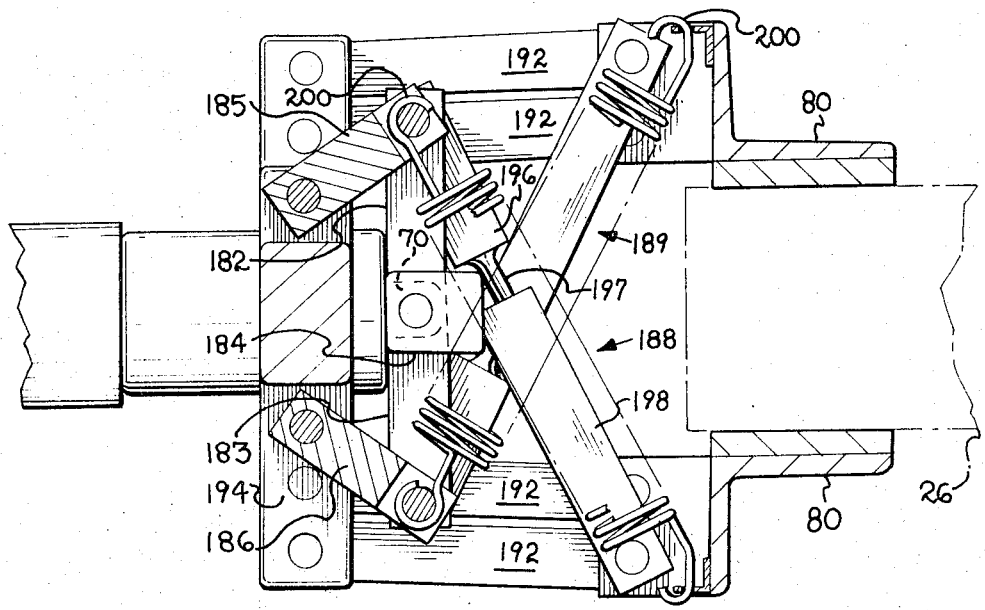
FIG. 10 is a cross-sectional view of the clamp mechanism of FIG. 8 taken at line 10—10.
Figure 9:
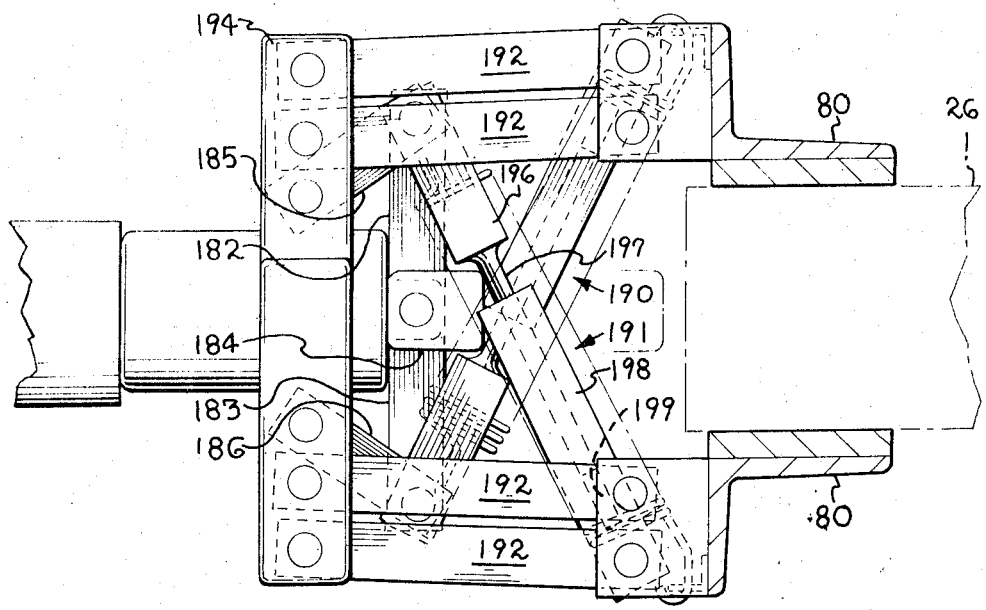
FIG. 9 is an end view of the clamp mechanism of FIG. 8.

As best seen in FIG. 5, the toggle mechanism 81 for closing the clamp jaws 80 comprises four off-set arms, 180, 181, 182, and 183, pivotally mounted on an extension of the hollow shaft 70. Two of the off-set arms 180 and 181 are mounted on one side of the hollow shaft 70, and two of the off-set arms, 182 and 183, are mounted on the other side. A tie plate 184 serves to connect one end of the four off-set arms 180, 181, 182 and 183 as a unit. FIG. 3 clearly shows that the other ends of the off-set arms 182 and 183 are connected to an elongated upper rocker plate 185 and an elongated lower rocker plate 186 respectively. The off-set arms 180 and 181 are similarly connected to the upper and lower rocker plates 185 and 186. Off-set extensible cross links 188, 189, 190 and 191 serve to connect the upper rocker plate 185 to the lower of clamp jaws 80 and the lower rocker plate 186 to the upper of clamp jaws 80. A series of pivotally connected parallel motion links 192 serve to connect the upper and lower clamp jaws 80 to a jaw mounting casting 194. Note that the upper and lower rocker plates 185 and 186 are also pivotally attached to the jaw mounting casting 194. As shown in FIG. 4, when the open/close cam follower 72 is moved toward the arm carrier 66, the off-set arms 180, 181, 182 and 183 are caused to pivot by the movement of the hollow shaft 70 (attached to the open/close cam follower 72), thereby causing the upper rocker plate 185 to pivot upward and the lower rocker plate 186 to pivot downward. This motion of the rocker plates 185 and 186 will cause the clamp jaws 80 to close under the influence of the extensible cross links 188, 189, 190 and 191. The toggle mechanism 81 always moves to a fixed locked position under the control of the open/close cam follower 72. In order to accommodate bundles of varying thickness, the extensible feature of the extensible cross links 188, 189, 190 and 191 is required. That is, if the total linkage were of fixed link size, only one bundle size could be handled, because the clamp jaws 80 would always reach a fixed point. However, the bundle size may vary. As best illustrated by FIGS. 9 and 10, the clamp jaws 80 will close until they are stopped by a bundle 26 between them. At this point, the rocker plates 185 and 186 will complete their motion and reach a fixed point. However, the extensible cross links' 188, 189, 190 and 191 motion will not be stopped. Each of the extensible cross links 188, 189, 190 and 191 is made in two pieces, the upper segment 196 having an elongated pin 197 in telescoping engagement with a slot 199 in the lower segment 198. As the rocker plates 185 and 186 complete their stroke, the upper segment 196 will be withdrawn from th lower segment 198, thus effectively lengthening the extensible links 188, 189, 190 and 191. A plurality of springs 200 are connected between the rocker plates 185 and 186 and the upper and lower clamp jaws 80 and serve to provide a clamping force on the bundle held between the clamp jaws when the extensible links 188, 189, 190 and 191 are extended. The springs 200 also serve to keep the clamp jaws 80 in a neutral, open position, it being clear that without the springs 200, the upper and lower segments 196 and 198 of the extensible links could slide out of engagement, leaving the clamp jaws 80 hanging loosely, uncontrolled by the toggle linkage 81.

Referring to FIG. 11, the rear steadying cam 39 and the roll over cam 40 are shown in a partially exploded perspective view from the right front and removed from the mechanism carrier 12 of FIG. 2. Two cam support brackets 38 are shown for purposes of orientation. The steadying cam 39 controls the motion of the arm cam followers 84–89 to keep the bundles 26 in a substantially horizontal position from pick-up to unloading through the action of the shaft 67 on the clamps 30. The roll over cam 40, acting on the arm cam followers 84–87 in configuration C (see FIG. 5), will cause every second bundle 26 to be rotated 180° during the travel from the pick-up to the unload station. Consider first the action of the steadying cam 39 on the arm cam followers of configuration D (see FIG. 7 and Table 1). Along the bottom run of the steadying cam 39, the arm cam followers 88 and 89 are trapped between the rails of a dual rail cam 90 (see FIG. 12). Th followers 88 and 89 move in the direction indicated by the arrow with the dual cam follower 89 leading. This motion causes the rotatable arm 68 to follow a substantially horizontal path. It is during this period of travel that the incoming bundles 26 are picked up by the clamps 30. After the bundle pick-up, the drive chain 35, which is carrying the rotatable arm 68 through the guide rods 61 and the rotatable carrier 66, begins to rise. It should be emphasized that the center or pivot axis of the arm 68 is moved in a specific path which does not deviate through the cycle of movement of the bundles. The cam 39 can only effect the rotational position of arm 68. Just before this vertical rise begins, the dual cam follower 89 rides out of the dual track cam 90 and is controlled by a deflector cam 91. The other cam follower 88 cannot follow this path because the vertical rise has started by the time it reaches the rideout point of dual track cam 90. FIG. 12 shows, in a series of phantom line views, the position assumed by the rotatable arm 68 and the arm cam followers 88 and 89. The arm cam follower 88 is next trapped between the rails of a vertical dual rail cam portion 92 and forced to follow a vertical path. The net result is that the bundle 26, held by the clamp 30, is rotated so as to move vertically upward in the same horizontal orientation it held on the input conveyor 24. It can be seen that the dual arm cam followers 89 are not guided during the majority of the vertical rise. Just before the end of the vertical rise, the dual track cam 92 terminates. At this point, another dual rail cam portion 93 comes into operation (FIG. 13). The dual rail cam 93 is horizontally displaced from the vertical dual rail cam 92 a distance equal to the thickness of one arm cam follower 89. Thus, the outermost of the dual arm cam followers 89 will be engaged by the dual rail cam 93. It may be seen that the dual rail cam 93 is substantially L-shaped, with a relatively short vertical leg and a much longer horizontally innclined leg. At the transition point between the two legs, the rotatable arm 68 again pivots and rotates the bundle 26 to maintain its substantially horizontal orientation. The inclined leg of the dual rail cam 93 does allow the bundles to rise at a slight angle, as may be seen from the position of the clamps 30 in FIG. 1.

FIG. 13 shows, in a series of phantom views, the position assumed by the arm cam follower 88, the dual arm cam follower 88, the dual cam follower 89 and the rotatable arm 68 during this transition. Note that during the transition, the arm cam follower 88 passes over the dual rail cam 93. This is possible because the dual rail cam 93, as noted before, is horizontally displaced from the plane of the arm cam follower 88. Arm cam follower 88 may now be seen to be moving above the outside edge of the outermost of the two rails comprising the dual rail cam 93, while the dual arm cam follower 89 is trapped between the rails of the dual rail cam 93 and held in engagement by the turning moment of the bundle 26. Near the end of the dual rail cam 93, the arm cam follower 88 engages the unload station dual rail cam 94. The dual cam follower 89, after it rides out of the dual rail cam 93, is free, much in the same manner as the arm cam follower 88 was in the vertical dual rail cam 92. See FIG. 14 for a series of phantom line views showing the cam followers 88 and 89 and rotatable arm 68 in various positions during this operation. The unload station dual rail cam 94 then causes the bundle 26 to pivot slightly again to be in a horizontal position for unloading. This cam 94 provides a similar motion at its lower end, after the bundle 26 has been unloaded to present the followers 88 and 89 for engagement with the lower dual rail cam 90. In the case of the C arm cam follower configuration, neither of the single arm cam followers 84 and 85 can reach the dual rail cam 93 for engagement. Instead, one of the arm cam followers 86 or 87 engages the roll over cam 40. In this case, the dual rail cam 93 does not come into play. Rather, the roll over cam 40 is so shaped as to cause the arm 68 and bundle 26 to be rotated 180°. After the roll over, the arm cam follower 84 or 85 will engage the unload station dual rail cam 94 and the operation will be the same as previously explained. Note that only one of the arm cam followers 86 or 87 are engaged in the roll over cam 40 for rotation of the bundle 26. Two cam followers 86 and 87 are needed because the rotatable arm 68 is rotated 180° during the cycle and whichever cam follower 86 or 87 was not engaged during one inverting cycle will be engaged on the next inverting cycle with the other cam follower 86 or 87 being inactive. Because of this rotation of the rotatable arm 68, the arm cam followers 84 and 85 will alternatively engage the unload station dual rail cam 94. Under some circumstances, it may prove desirable not to rotate every other bundle 26 180°. In such a case, all of the arm cam followers would be of the D configuration, thus avoiding engagement with the roll over cam 40.

FIG. 15 shows the outer clamp function control cam 41, the inner clamp function control cam 42, the outer carriage shifting cam 43, the inner carriage shifting cam 44, the movable, outer clamp opening cam 45 and the movable, outer carriage shifting cam 46, in perspective, removed from the mechanism carrier 12. Also, at least partially visible, are the movable, inner clamp opening cam 51 and the movable, inner carriage shifting cam 52. Also visible are an inner clamp closing air motor 95 and an outer clamp closing air motor 96.

These air motors 95 and 96 are used to shift movable sections 155 and 156 of the cams 41 and 42 to close the clamp 30 at the pick-up station. It may now be appreciated that those shifting cam followers 65 and open/close cam followers having a B configuration (see FIG. 6) will follow the inner cams 42 and 44, while those having an A configuration will follow the outer cams 41 and 43 (see FIG. 3).

Figure 16:
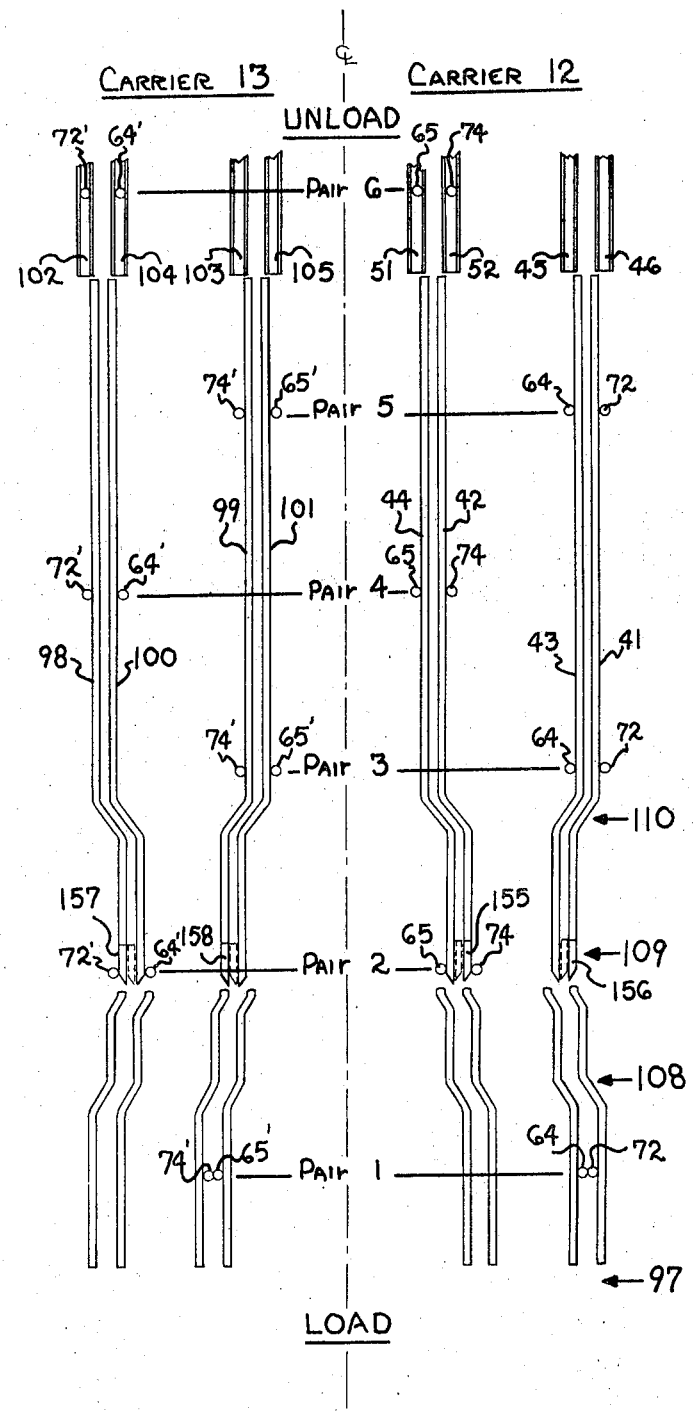
FIG. 16 is a diagrammatic flat layout of the guide cams of FIG. 15 and the complementary cams on the opposite side of the mechanism.

While FIG. 15 shows the actual configuration of the cams which control the opening and closing of the clamps 30 and the shifting of the member 63, reference should now be made to FIG. 16, wherein all of these cams for both mechanism carriers 12 and 13 are laid out flat. This flat lay-out of these cams will be used to explain their function relative to the machine motions that they control. As an aid to orientation relative to the overall machine, the load and unload positions of the machine are noted as well as the machine center line. Note that the depicted spacing between the respective cams carried by the mechanism carriers 12 and 13 is much smaller than would ordinarily be the case in operation.

It may be seen from FIG. 16 that the mechanism carrier 13 supports an outer clamp function control cam 98, an inner clamp function control cam 99, an outer carriage shifting cam 100, an inner carriage shifting cam 101, a movable, outer clamp opening cam 102, a movable, inner clamp opening cam 103, a movable, outer carriage shifting cam 104, and a movable, inner carriage shifting cam 105 which cooperate with and are mirror images of the cams 41, 42, 43, 44, 45, 46, 51 and 52 that are supported by the mechanism carrier 12. As a further aid in explanation, the twenty-four open/close and shifting cam followers carried by the six pairs of carriages 82 are shown in their approximate relative positions along the various cams. Primes have been applied to the reference numerals for the followers on the carrier 13. With reference to Table 1 and FIGS. 3 and 6, it is now obvious that the open/close cam followers 72, 72' and shifting cam followers 64, 64' of the A configuration track the outer set of cams, while the open/close cam followers 74, 74' and shifting cam followers 65, 65' of the B configuration track the inner set of cams. The lower end of the flat cam lay-out of FIG. 16 is begun at about the point designated by arrow 97 in FIG. 15.

The designation of follower pairs, as hereinafter used, shall correspond to the configurations tabulated in Table 1 and correspond to the pairs shown in FIG. 16. Beginning at point 97 in FIG. 16, the first pair of followers 74' and 65' and 64 and 72 are shown in the position after unloading and before pick-up. In this position, the respective clamps 30 are shifted as far as possible away from the machine center line, the position assumed during the unloading cycle to allow the clamp jaws 80 to clear the stratified stack 27 of bundles 26. The open/close cam follower 74' and the shifting cam follower 65' are held close together trapped between the spaced cams 99 and 101, the clamp jaws 80 consequently being open. The corresponding followers 72 and 64 of the other clamp 30 in the first pair are seen to be in a similar configuration, trapped between the spaced cams 43 and 41. Moving up the cams from the load position, the cams 41, 42, 43, 44, 98, 99, 100 and 101 all execute an inward bend toward the machine center line at the level designated by the arrow 108. This inward bend causes the shifting cam followers 64 and 65' of the first pair to be moved from their extreme retracted position to a position centered with respect to incoming bundles 26. This shift, of course, shifts the entire shifting member 63 and the clamp 30. Since the open/close cam followers 72 and 74' remain close to the shifting cam followers 64 and 65' during this motion, the clamp jaws 80 remain open. The position of Pair 2 is shown at the bundle pick-up position. Notice that the cam followers associated with Pair 2 are tracking the cams 42, 44 and 98, 100. The cam followers 64, 65, 72' and 64' emerge from between the cams 42 and 44 and 98 and 100 just before the pick-up point 109 and track the outside of the respective cams. At the pick-up point 109, a movable section 157 and 155 (shown in phantom lines) of the clamp closing cams 98 and 42 is moved by the inner clamp closing motor 95 (FIG. 15) and a corresponding air motor associated with the outer clamp closing cam 98. This motion separates the open/close cam follower 74 and the shifting cam follower 65 and the open/close cam follower 72' and the shifting cam follower 64', thereby closing both pairs of clamp jaws on the bundle 26. This motion is initiated by a switch (not shown) which responds to the movement of the clamps into the position of Pair 2. It may be seen that when Pair 1 has reached the corresponding position 109 on its controlling cams 42, 44, 99 and 101, a similar operation will occur. Pair 3 is shown just after the bundle shifting motion which takes place at the level designated as 110. Again, note that the cam followers 64 and 72 and 65' and 74' of Pair 3 are controlled by the cams 41 and 43 and 99, 101. As may be seen, the cams 101 and 99 bend toward the machine center line, while the cams 41 and 43 bend away from the machine center line. Since the shifting cam followers 64 and 65,' when moved, shift the mechanism 63 and consequently the clamp jaws 80 (which are holding the bundle 26 at this point) the result of the change in direction of the cams 41 and 43 and 99 and 101 is to shift the entire bundle to the left, as viewed from the machine unload station. When Pair 2 reaches level 110 on its cams 42 and 44 and 98 and 100, the shift will be to the right relative to the machine center line, as viewed from the unload station. Pair 1 would then be shifted to the left, as it reached point 110, the same as was Pair 3. Pairs 4 and 5 are shown to illustrate that the clamp supports 63 are held in their shifted position with the clamp jaws 80 closed. Note from Table 1 that Pairs 1, 3 and 5 have a C configuration which means that the bundles 26 carried by these pairs will be rotated 180° during the travel from the point 110 to the beginning of the movable cam sections 45, 46, 51, 52, 102, 103, 104 and 105. Pair 6 is shown to be in the movable cams 51 and 52 and 102 and 104. These movable cams cause the bundles 26 to be deposited on the stratified stack 27 and move the cam followers 65 and 74 and 64' and 72' to a position to be engaged between the cams 42 and 44 and 98 and 100 at the point 97 where they will track in a manner similar to that described previously for Pair 1. The mechanism for operating the movable cam sections 45, 46, 51, 52, 102, 103, 104 and 105 will be explained next.

Figure 17:
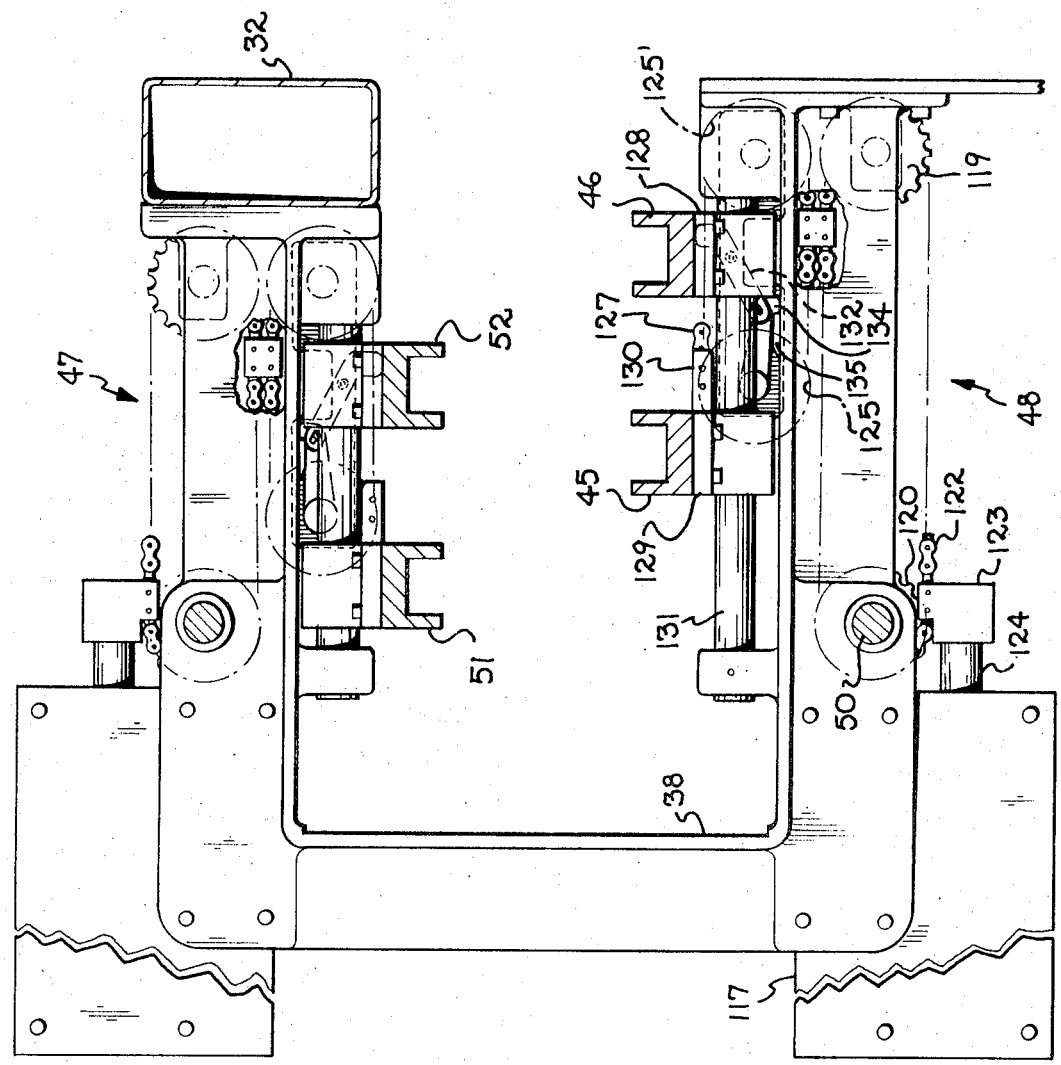
FIG. 17 is a cross-sectional view taken at line 17—17 of FIG. 2 on an enlarged scale.
Figure 18:
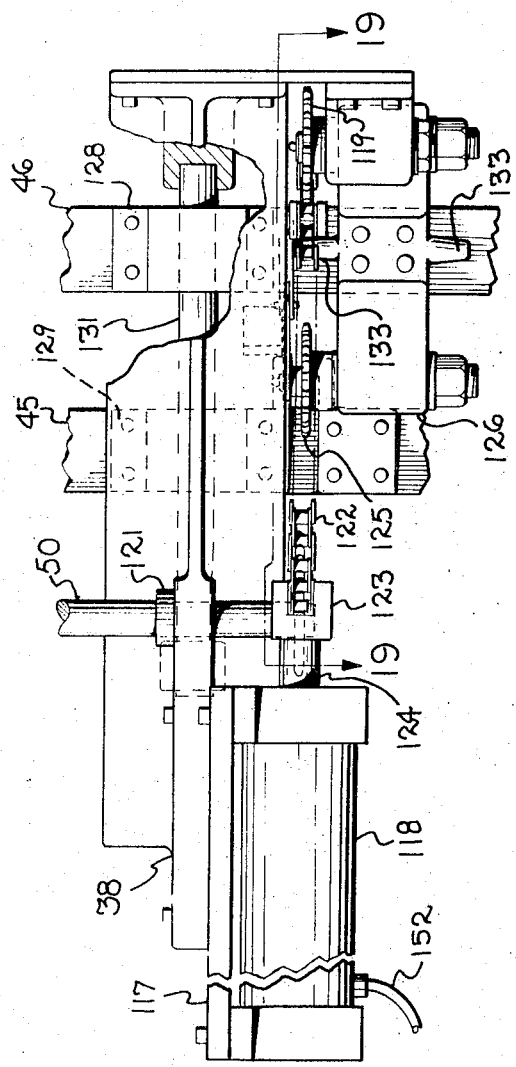
FIG. 18 is a front elevational view of the apparatus of FIG. 17.
Figure 19:
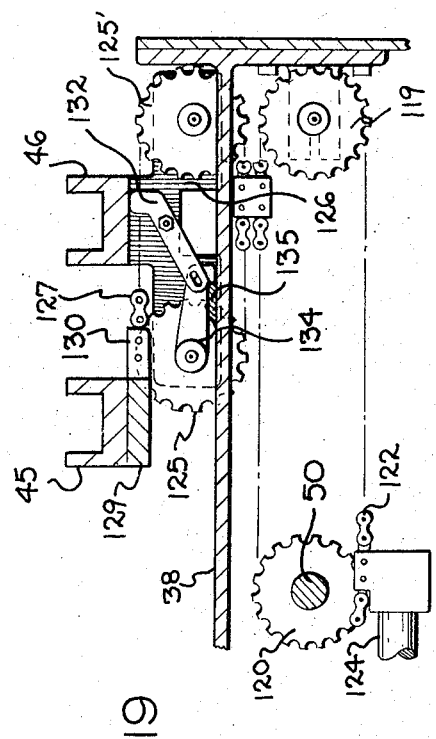
FIG. 19 is a cross-sectional view taken at line 19—19 of FIG. 18.

Referring now to FIG. 17, the operating mechanism generally designated 48 for the movable unloading cams 45 and 46 and the operating mechanism generally designated 47 for the movable cams 51 and 52 are shown and can be seen to be similar in configuration, with the exception that the extent of movement of the mechanism 47 relative to that of 48 is less. There are corresponding identical operating mechanisms mounted on the other mechanism carrier 13 which perform the same functions and motions for the cams 102–105. Thus, the description of the apparatus will be principally directed to the operating mechanism 48, but is equally applicable to the operating mechanism 47 and the other mechanisms which are not shown. A mounting plate 117, secured to one of the cam support brackets 38, serves to carry an air motor 118 (See FIGS. 2 and 18). A chain sprocket 119 is also rotatably supported by the same cam support bracket 38. A second rotatable chain sprocket 120 is fixed to the lower end of shaft 50, which in turn is rotatably mounted in a bearing 121 mounted in the cam support bracket 38. An endless chain 122 is trained over the two sprockets 119 and 120. A connecting block 123 is attached to an operating rod end 124 of the air motor 118. The connecting block 123 is pinned to the endless chain 122. Thus, extension of the air motor operating rod end 124 will move the chain 122 and rotate the sprockets 119 and 120 and the connecting shaft 50. Two additional chain sprockets 125 and 125' are rotatably mounted on a shifting block 126. The shifting block 126 may best be seen in FIG. 18. An endless chain 127 serves to connect the two sprockets 125 and 125'. A link of the chain 127 is pinned to a link of the chain 122 so that the chains move together. The movable, outer carriage shifting, cam 46 is bolted to the shifting block 126 in the operating mechanism 48 as best seen in FIGS. 18 and 19. As best seen in FIG. 19, the movable outer carriage shifting cam 46 is attached to the shifting block 126 on an extension thereof. The movable carriage shifting cam 46 is additionally bolted to a T-shaped guide block 128 which may best be seen in FIGS. 17 and 18. The movable outer clamp closing cam 45 is also attached to a T-shaped guide block 129. The guide block 129 is substantially longer in the vertical direction than the guide block 128, with an extension 130 formed thereon and being pinned to the endless chain 127 for movement therewith. A guide rod 131 is fixed to the cam support bracket 38 and passes through an opening in the T-shaped guide blocks 128 and 129. It may be seen in FIG. 17 that the guide rod 131 for the operating mechanism 48 is longer than the comparable guide rod for the operating mechanism 47. This difference in length is due to the fact that the cam followers which enter the movable cams 45 and 46 will always be shifted towards the center of the machine and thus will have to be moved a greater distance away from the center of the machine in order to clear the stratified stack 27 of corrugated material, than the cam followers which enter the movable cams 51 and 52. An L-shaped latch arm 132 is pivotally mounted on an extending post 133 which is integrally cast with the shifting block 126. It will be noted in FIG. 18 that there are actually two extending posts 133 cast with the shifting block 126. This allows the shifting block 126 to be used in either right-hand or left-hand configurations without modification. The end of the L-shaped latch arm 132 opposite the leg of the L is bifurcated and slotted to accept a pin mounted on an L-shaped trigger arm 134. The trigger arm 134 is pivotally mounted on a shaft in common with the sprocket 125 mounted on the shifting block 126. A latching lobe 135 is attached to the web of the cam support bracket 38. As the operational cycle begins, the leg of the L-shaped trigger arm 134 is trapped behind the latching lobe 135. Thus, the effect of moving the chain 122 will be to move the chain 127 since the shifting block 126 is locked in position by the trigger arm 134 and the latching lobe 135.

The operational sequence of the cam operating mechanism 48 is as follows: the configuration of the parts shown in FIGS. 17, 18 and 19 is assumed to be just before the unloading sequence begins. The air motor rod 124 is retracted, as shown, and the shifting block 126 is latched. Note that the two cams 45 and 46 are in a spaced-apart relationship, indicating that the clamp jaws 80 are closed. The open/close cam follower 72 (see FIG. 3 or 4) will be engaged in the cam 45 and the shifting cam follower 64 will be engaged in the cam 46. Upon signal, the air motor rod 124 will start to extend, moving the chain 122, the sprockets 119 and 120, the connecting shaft 50 and the chain 127. Observe that the chain 127 and the sprockets 125 and 125' will move because the shifting block 126 is locked in place. Movement of the chain 127 will move the cam 45 toward the cam 46, thereby opening the clamp jaws 80 (see the prior discussion of the function of the open/close cam follower 72, which will, of course, be moved with the cam 45). Before the two cams 45 and 46 touch, the extending portion 130 of the T-shaped guide block 129 will contact the end of the L-shaped latch arm 132 and pivot the latch arm 132 in clockwise direction. Pivoting the latch arm 132 in turn will pivot the L-shaped trigger arm 134 and release the leg of the trigger arm 134 from behind the latching lobe 135. This then will result in the chain 122 driving the shifing block 126 to the left as viewed in FIG. 19, instead of the chain 127. The net result will be that both of the cams 45 and 46 will retrace the path just travelled by the cam 45 in a retrograde motion. The clamp jaws 80 will remain open and the entire carriage assembly 82 will be shifted to a position which will allow the clamp 30 to clear the stacked corrugated bundles 26, keeping in mind the prior discussion of the function of the shifting cam follower 64 which is moved by the motion of the cam 46. Once the carriage assembly 82 has left the vertical unloading station and passed out of the cams 45 and 46, a reset signal, sent by a switch 160 (see FIG. 20) which is tripped by the movement of cariage assembly 82, will cause the air motor 124 to retract and reset the mechanisms 48 for the next cycle. A corresponding switch 161 is used to reset the mechanism 47. The resetting cycle includes moving the leg of the L-shaped trigger arm 134 so that it will rise up and fall behind the latching lobe 135, thereby locking the shifting block 126 into position. This reset cycle need not be rapid, since the next carriage 82 will now use the cams 45 and 46 but rather will be guided into the corresponding movable cams 51 and 52 attached to the shifting mechanism 47.

Figure 20:
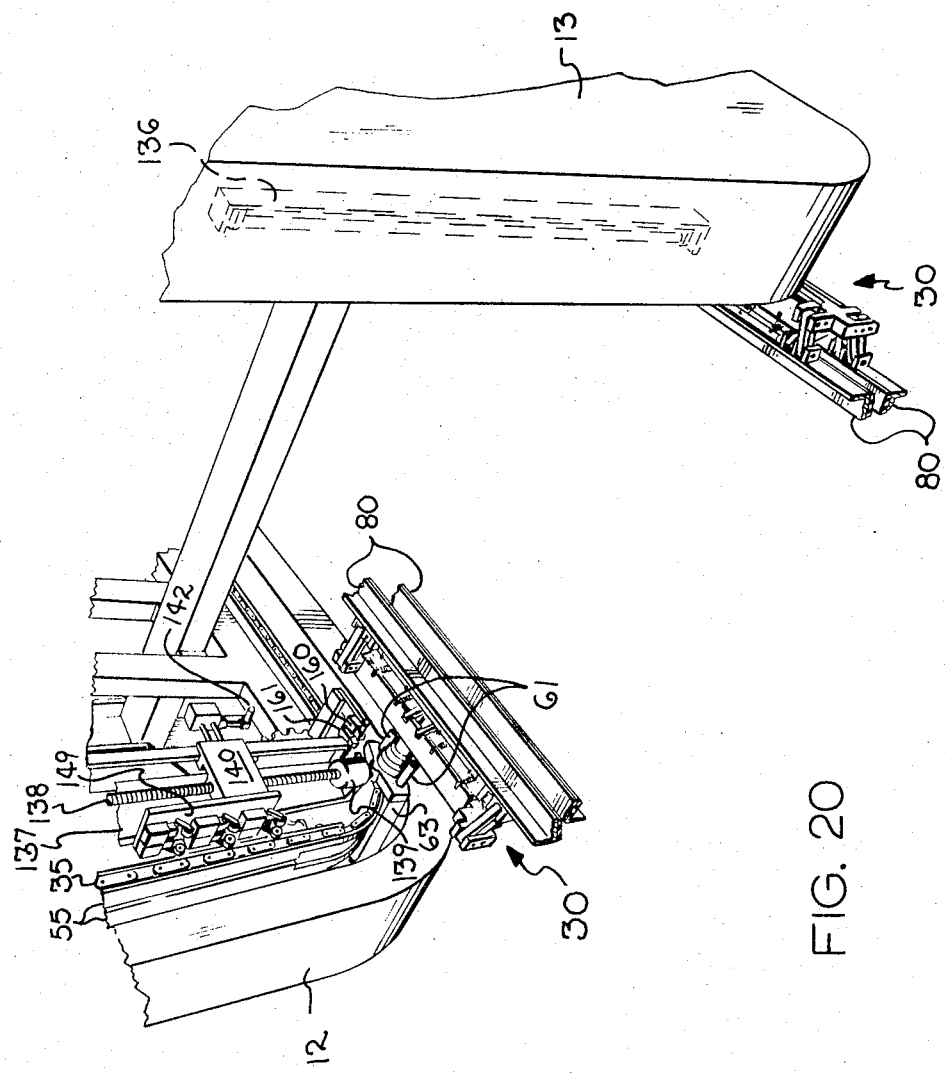
FIG. 20 is a perspective view of the lower front corner of the apparatus of the invention, illustrating the position of the control switches and photocell.

FIG. 20 shows the control scheme for the mechanism 48 and the other three powered mechanisms of the machine corresponding to the mechanism 48. Mounted on the mechanism carrier 13 is an elongated light source 136. Mounted on the mechanism carrier 12 is a shaft bracket 137. Rotatably mounted in the shaft bracket is a threaded shaft 138. A drive motor 139, attached to the threaded shaft 138, serves to drive the shaft 138. Mounted on the shaft 138 is a threaded switch carrier 140 which moves up and down the shaft 138, depending on the direction of rotation of the motor 139 which is a reversible type motor. The switch carrier 140 has attached to it a switch array and a photocell 142 aimed at the light source 136.

Figure 21:
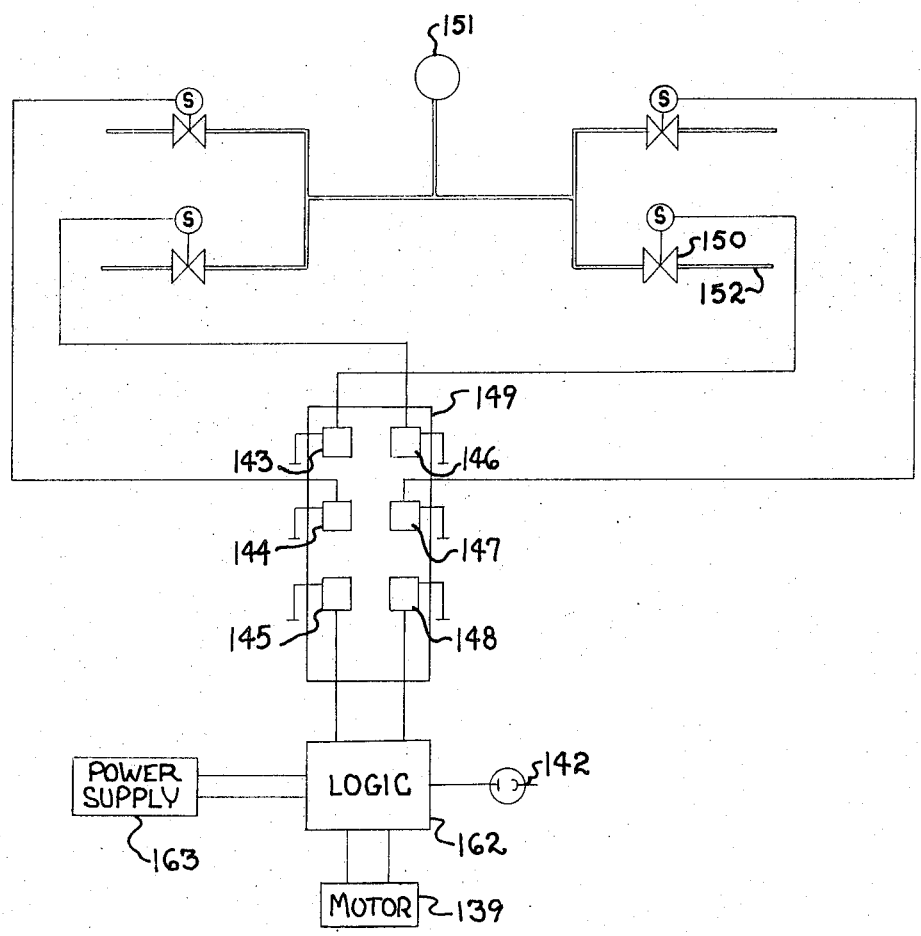
FIG. 21 is a schematic circuit diagram of the hydraulic and electrical system of the invention.

Referring now to FIG. 21, the switch array is seen to consist of six lever actuated switches 143, 144, 145, 146, 147 and 148 mounted in two parallel rows of three on a carrier plate 149 which is in turn attached to the switch carrier 140. The drive motor 139 is wired to the photocell 142 such that the motor 139 will operate, raising the photocell 142, until light from the light source 136 is sensed by the photocell 142, the light being blocked prior to this time by the stack 27. At this point, the motor 139 will stop, leaving the switch array in position to control unloading of the next bundle 26 on the stack 27. It can be seen in FIG. 3 that each shifting member 63 carries a trip lobe 83. In those members 63 which are shifted to the left relative to the machine center line, the lobe 83 will trip, in sequence, the three switches 143, 144 and 145 in the left column in FIG. 21. Those members 63 which are shifted to the right will, through lobe 83, trip the three switches 146, 147 and 148 in the right column in FIG. 21. The upper two switches 143, 144, 146 and 147 in each of the two columns each control the unloading function of one clamp 30. The lowermost of the switches 145 and 148, in each of the two columns in FIG. 21 are wired to the drive motor 139 through a logic circuit 162. When this third switch is tripped by the lobe 83, the carrier plate 149 is raised until the photocell 142 again senses the top of the stack 27 and stops the drive motor 139, leaving the plate 149 in position to control unloading of the next bundle 26 onto the stack 27. Power is supplied to the motor 139 through the logic circuit 162 by power supply 163.

FIG. 21 further shows, in schematic form, the control of the cam operating mechanisms 48 by the switch array 141. Air motor 118 (keeping in mind that there are four such air motors per machine) is controlled by a solenoid valve 150. Compressed air from a source 151 is directed through pipes to the solenoid valve 150 and from there to the air motor 118 through the pipe 152. As previously noted, four of the switches (143, 144, 146 and 147) are connected to solenoid valves by electrical wiring, thereby controlling the operation of their respective air motors. The remaining two switches (145 and 148) are connected to the drive motor 139 through the logic unit 162. The switch 143 controls the air motor 118 which moves the cams 45 and 46. The switch 144 controls an air motor which moves the cams 103 and 105. The switch 146 controls an air motor which moves the cams 102 and 104. Finally, the switch 147 controls an air motor which moves the cams 51 and 52. FIG. 21 shows that either the switch 143 or the switch 146 will be tripped first by the lobe 83 depending on the side to which the shifting member 63 has been shifted. Assume the case in which the pair of clamps 30 carrying a bundle 26 have been shifted to the left relative to the machine center line as viewed from the unload position. Due to the alternative right and left shifting of the clamps 30 which carry the bundles 26, the stratified stack 27 presents a series of steps on each side (see FIG. 1). Thus, as bundles 26 are sequentially unloaded to build the stack 27, a space will occur on alternating sides of the stack 27. Thus the next clamp 30 may descend slightly lower, before dropping the bundle 26, than may the other clamp 30 in the pair, the other clamp being blocked by the stack. Thus, the array of switches is set up such that the clamp 30 which will hit the top of the last bundle 26 in the stack 27, first is controlled by the first switch, either 143 or 146. This will open the clamp jaws 80 and start to retract the clamp 30 before the carriage lobe 83 trips the next switch 144 or 147. The switches 144 and 147 which control the clamp 30 that is descending into the aforementioned space in the stack 27, are positioned so that the clamp 30 is not opened until the clamp is in the space. This sequence allows maximum control of the placement of the bundles 26 on the stack 27.

We claim:

1. The method of handling multiple blanks of corrugated paperboard that are accumulated from the exit of a corrugator into bundles with the plural bundles being ejected at right angles to the machine direction of the corrugator, comprising the steps of:

grasping a group of at least two of said bundles, on opposite sides along the longitudinal dimension of said group of bundles and wherein said bundles have identical transverse dimensions;

moving the grasped group of bundles to a remote position overlying a stacking position;

releasing said group of bundles at said stacking position;

simultaneously with the moving of said group of bundles to said remote position, shifting said group of bundles sequentially and alternately to the right and to the left to thereby cause formation of a stratified stack at said stacking station having layers horizontally displaced to the right and to the left relative to the vertical centerline of said stack in an alternating pattern; and repeating the foregoing steps in overlapping sequence.

2. The method of claim 1 which further includes the step of:

rotating every other group of said bundles through 180° during movement to said remote position.

* * * * *